United States Patent [19]
McDonald

[11] 3,855,898
[45] Dec. 24, 1974

[54] PROTECTIVE PANEL FOR A VEHICLE DOOR

[75] Inventor: Wilson C. McDonald, Phoenix, Ariz.

[73] Assignee: Goodyear Aerospace Corporation, Akron, Ohio

[22] Filed: Dec. 12, 1972

[21] Appl. No.: 314,295

[52] U.S. Cl................ 89/36 H, 49/502, 109/49.5, 296/146
[51] Int. Cl............................................. F41h 5/00
[58] Field of Search.......... 296/146, 152, 153, 31 R, 296/31 P; 89/36 R, 36 A, 36 H; 109/49.5; 49/460, 502

[56] References Cited
UNITED STATES PATENTS
| | | | |
|---|---|---|---|
| 2,438,185 | 3/1948 | Prance............................. | 296/31 P |
| 2,600,296 | 6/1952 | Jacobs............................. | 296/153 |
| 3,369,836 | 2/1968 | Haycock et al.................... | 296/78.1 |

FOREIGN PATENTS OR APPLICATIONS
| | | | |
|---|---|---|---|
| 1,432,466 | 2/1966 | France............................. | 89/36 H |

Primary Examiner—David Schonberg
Assistant Examiner—John A. Pekar
Attorney, Agent, or Firm—Oldham & Oldham

[57] ABSTRACT

Protective panels for the windshields and windows of a vehicle are provided and comprise tough, bullet resisting transparent plastic panels and means for securing the panels to a vehicle. Such securing means include fabric straps or metal clips, secured to the transparent panel and engaging window trim means, the windshield guard strip, etc., of a vehicle. A protective panel can be secured by attaching means to the inside of side doors and other portions of the vehicle.

1 Claim, 11 Drawing Figures

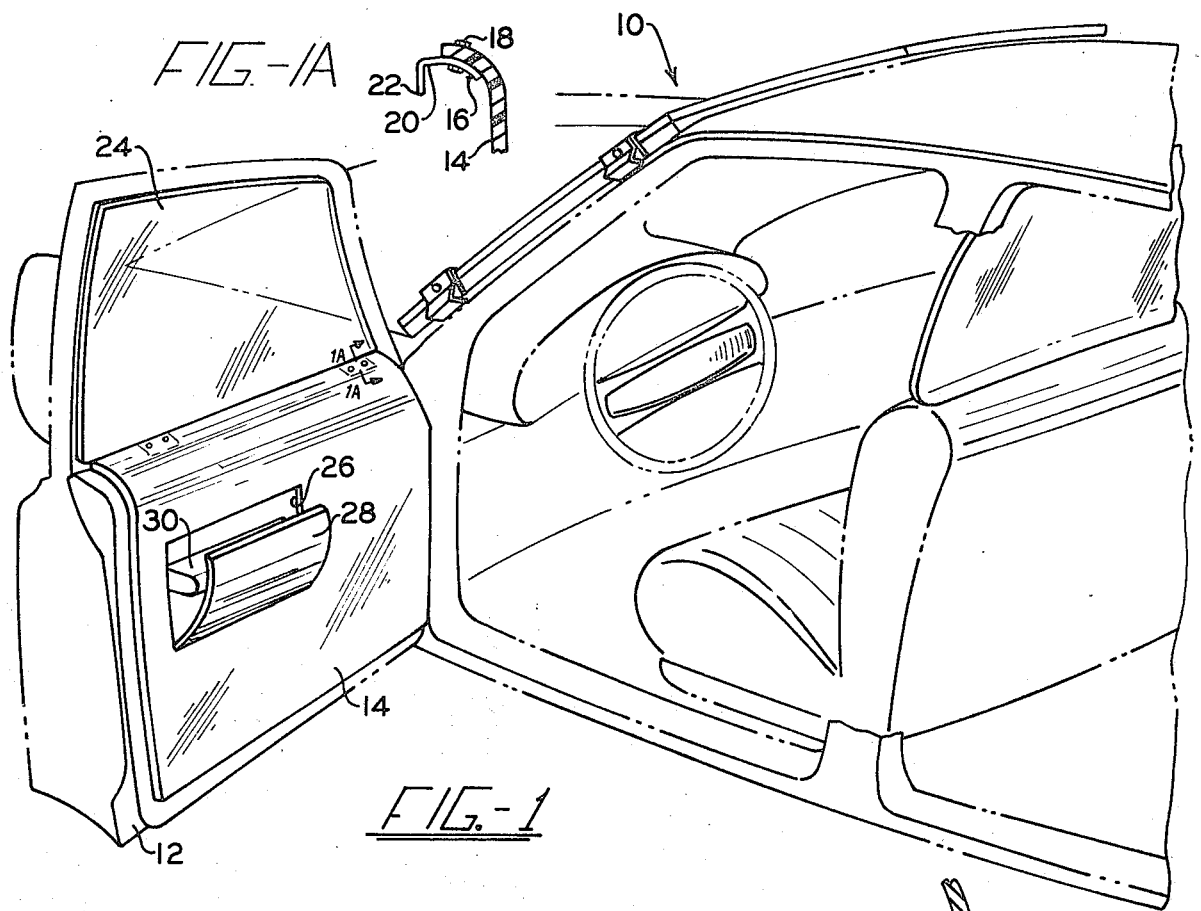
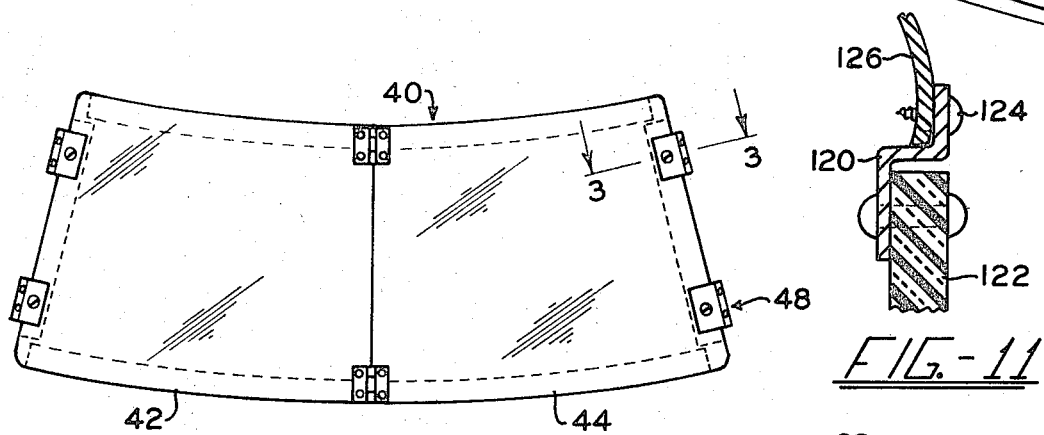
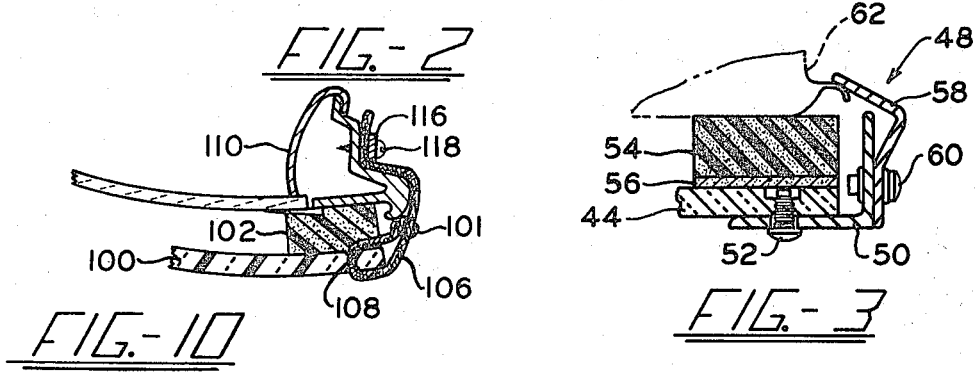

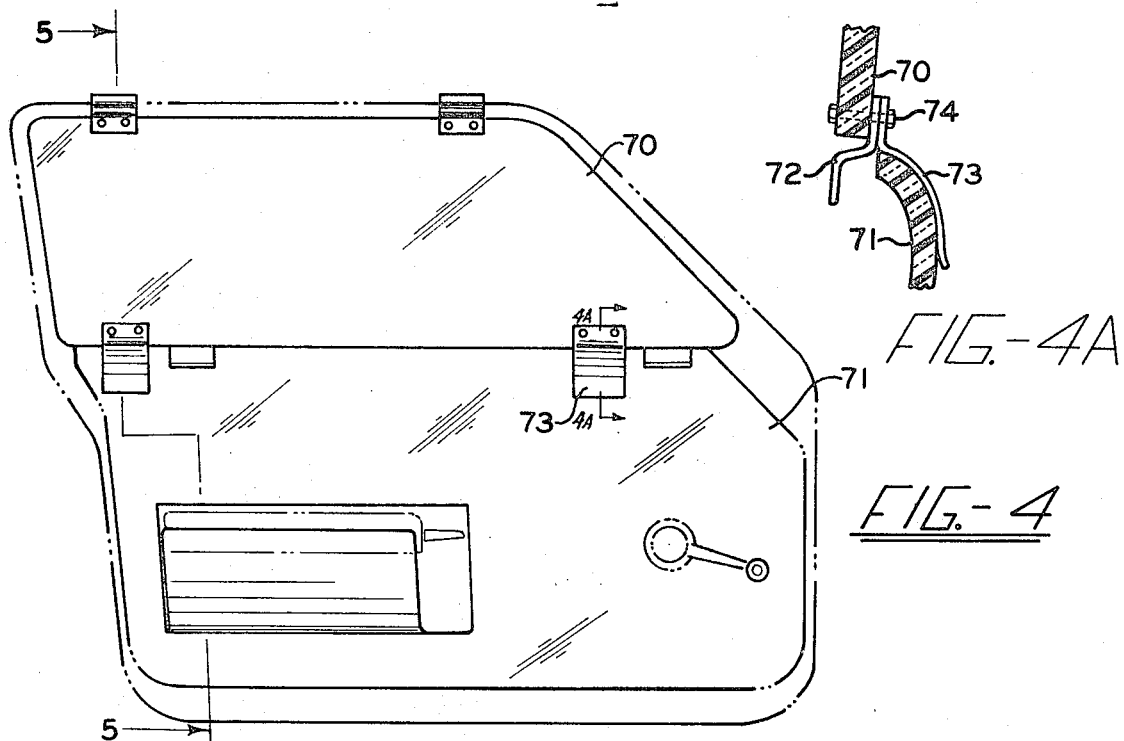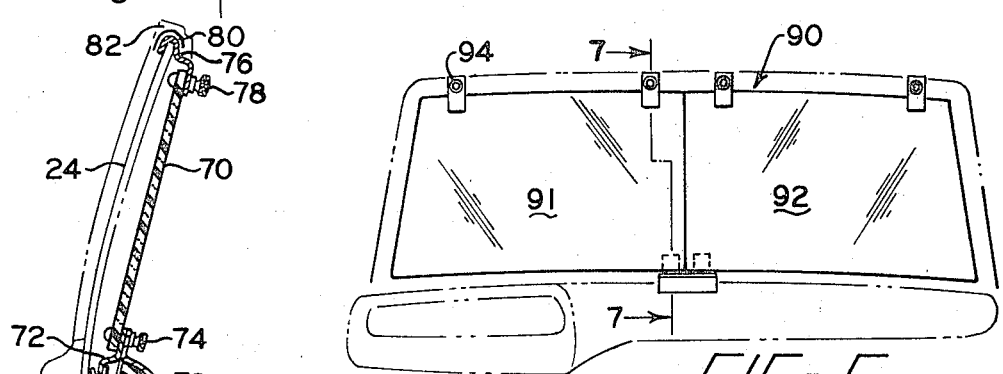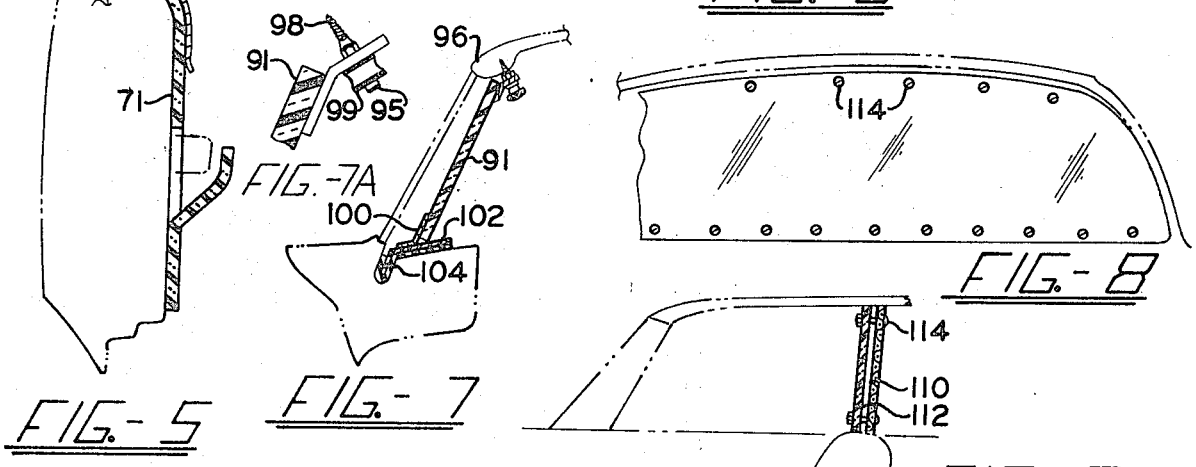

PROTECTIVE PANEL FOR A VEHICLE DOOR

BACKGROUND OF INVENTION

While efforts have been made heretofore to provide bullet resistant or bulletproof means for vehicles, much of such previous work has involved relatively heavy metal plates in or attached to a vehicle. With reference to the windows and windshield of a vehicle, some previous efforts have been made to strengthen these portions of the vehicle and to protect its passengers. However, such constructions may be attached permanently to the vehicle, or they may be of relatively costly construction, or they may have been unsatisfactory in use, or be otherwise objectionable.

The general object of the present invention is to provide relatively lightweight, transparent plastic protective panels for vehicles characterized by the panels being adapted to be attached readily in a removable manner to standard vehicles with minimum alterations therein to provide bullet resistant means in window, windshield and other areas of a vehicle.

Another object of the invention is to provide transparent plastic panels, which are bullet resistant, or substantially so, and which can be readily bolted, clamped or attached to the inner surface of side windows or other portions of a vehicle; and/or to provide panels which have metal or other attaching straps suitably secured thereto and adapted to have removable engagement with doors or other portions of the vehicle.

Other objects of the invention are to provide relatively inexpensive, lightweight protective panels for use with vehicles, and to provide attaching clips and similar means for the panels whereby the panels can be removably attached to vehicle windows, windshields and the like, but to permit disassembly of the protective panels and application to another vehicle, as desired.

The foregoing and other objects and advantages of the invention will be made more apparent as the specification proceeds.

Attention now is directed to the accompanying drawings, wherein:

FIG. 1 is a perspective view of a vehicle with a protective door panel of the invention attached to the side door thereof;

FIG. 1A is an enlarged cross sectional view taken on line 1A—1A of FIG. 1.

FIG. 2 is an elevation of a windshield protective panel separate from the vehicle;

FIG. 3 is an enlarged section taken on line 3—3 and indicating how the panel of FIG. 2 can be secured to the vehicle;

FIG. 4 is a side elevation of a door having protective panels of the invention attached to both the window area and lower portion of the door;

FIG. 4A is an enlarged cross sectional view taken on line 4A—4A of FIG. 4.

FIG. 5 is a fragmentary vertical section taken on line 5—5 of FIG. 4;

FIG. 6 is an elevation of a protective panel for a vehicle attached to the inner surface of the windshield of the vehicle;

FIG. 7 is a vertical section taken on line 7—7 of FIG. 6;

FIG. 7A is an enlarged cross sectional view of the clamp of FIG. 7.

FIG. 8 is an elevation of a protective panel for a partition in a vehicle;

FIG. 9 is a vertical section through the protective panel of FIG. 8 and its associated means;

FIG. 10 is a fragmentary section of a modified windshield cover panel and its attaching means; and FIG. 11 is a fragmentary section of another panel.

When referring to corresponding members shown in the drawings and referred to in the specification, corresponding numerals are used to facilitate comparison therebetween.

Attention now is directed to the details of the construction shown in the accompanying drawings, and a vehicle is indicated as a whole by the numeral 10. This vehicle 10 has a side door 12 thereon and a protective panel 14 is provided for the lower or base portion of the side door 12. The panel 14 is made from the tough, transparent, bullet resisting material of the type such as is disclosed in copending patent application Ser. No. 116,287, filed Feb. 17, 1971. This material is an aliphatic or alicyclic urethane characterized by a tensile strength of at least 6,000 lbs. at rupture and a shore D hardness greater than 60 but less than 100.

The protective panels of the present invention are bullet resistant and transparent or very lightly tinted in color. The invention provides various protection levels by increasing the thickness of the plastic protective sheets used. About a 40 inch thickness of the plastic sheets of the invention provide protection against most common hand guns, such as 22 caliber, 32 caliber, 38 caliber and 45 caliber. Obviously the protective values can be increased if thicker panels or sheets are used.

While one particular type of bullet resisting material has been mentioned, other equivalent materials can be used, but with possibly slightly less efficient bullet resistant characteristics being obtained. Hence, plexiglas, polycarbonates, or other less effective materials could be used to form the plastic panel or sheet 14 which normally is in the vicinity of about 40 to about 50 inches thick.

The panel 14 has a pair of metal brackets or strips 16 secured to the upper ends thereof as by cap screws 18 or the like. These strips 16 follow the contour of the door and each has an edge flange 22 directed downwardly of the vehicle. Such flanges 22 are adapted to be received between the window 24 provided in the vehicle and sealing strip and/or the inner frame mounting means or trim provided for the window, for example, being positioned against the resilient sealing strip provided on the inner surface of the vehicle door at the window opening. Hence, the panel 14 can be performed to proper contour, the strips 16 be attached thereto, and then the panel can be secured operatively in position, as indicated in FIG. 1 for removable engagement with this side door 12. The window control arm is removed prior to securing the panel 14 in position after which the control arm is again operatively positioned. It should be noted that an opening 26 is provided in the panel 14 and that an upwardly extending curved section 28 is formed in the panel and is adapted to extend up around a conventional armrest 30 on the side door. Hence a protective member is provided over the entire lower part of the side door 12.

FIGS. 2 and 3 of the drawings show a protective panel 40 for use on the external surface of the windshield of the vehicle 10. Such panel 40 includes two laterally spaced sections 42 and 44 hingedly secured together by members such as hinges 46 suitably secured to adjacent center edge portions of the sections 42 and 44 whereby the panel can take a slight V-shape for closely corresponding to and following the contour of the vehicle windshield. Lateral edge portions of the sections 42 and 44 are each provided with a pair of vertically spaced positioning means or clip members indicated as a whole by the numeral 48. These clip means 48 include angles 50 which have holes therein through which cap screws 52 extend to secure the panel to the clip means. Usually, some type of cushioning means, such as a resilient pad 54 and a suitable attaching layer 56 of adhesive is provided on the panels 42 and 44 on the inner surface thereof for attaching the cushion layer thereto. The angle 50 also has an attaching arm or strip 58 secured to one leg thereof as by a cap screw 60 or similar means. Thus, this arm or clip 58 can engage the edge of a conventional windshield mounting strip or member indicated diagrammatically at 62 to facilitate mounting the member on the vehicle windshield for temporary, but fixed attachment thereto.

Reference also is made to FIGS. 4 and 5 and to an inner protective shield or panel 70 removably attached to and covering the side door window 24. A panel 71 covers the side door and it is, in general, similar to that panel 14 shown in FIG. 1. Re the panel 70, a foot attaching clip or bracket 72 is shown attached to the lower edge of the panel 70 as by cap screws 74 of the like. Such clip 72 has a lower end received between the upper edge of the frame of the side door 12 and the flexible sealing strip at the window opening. A second positioning clip or strap 73 also is secured to the panel 70 by the means 74 and it is contoured to engage the top inner surface of the door, or any cover panel thereon.

The upper end of this panel 70 has a clip 76 secured thereto as by a bolt or cap screw 78 of equivalent. The clip 76 is contoured to engage with the upper end of the window 24 and to seat in the resilient sealing strip 80 carried by the window trim strip 82 whereby again a removable but fixed attachment means is provided for the upper edge of the panel 70 at a pair of spaced portions thereof whereby the panel 70 is fixedly, but removably, secured to the vehicle door on the inside surface of the window 24 for protective action against bullets or other missiles not against or impacting on the side door window.

The clip 76 normally is engaged with the panel 70 by slotted openings so that the clip can be moved up in place as the window is closed. Naturally the panel is initially positioned when the window has been opened and then the wing nuts, bolts and/or other fastening members can be tightened to secure the plastic shield in place. All of the clips used as made from thin gage metal and can seat in the rubber or other moldings provided around the windows.

In positioning the panel 70 when the door side window is lowered, it permits the lower ends of the clip 72 to have or be inserted into the window receiving slot while the outer clip 73 is positioned over the inner door surface. Then as the window is raised, the window aids in securing the panel securely in position. These sheets or panels 70 as used normally do not fully occupy the window openings of the door but are slightly smaller than the door window to facilitate assembly.

A modified panel 90 for attachment to the inner surface of a vehicle window shield is indicated in FIGS. 6 and 7. Such panel preferably is divided into two laterally spaced sections 91 and 92 with a pair of attachment clips 94 being attached to the upper edges of each of the sections 91 and 92 by any suitable means such as screws. These clips 94 protrude vertically upwardly from the windshield panel and can be secured, for example, to the upper windshield molding 96 as indicated in FIG. 7 of the drawings. Heads of bolts 95 are soldered, for example to anchor screws 98 that extend through the molding. The panel 91 is secured to the bolt by the nut 99.

The lower portions of these windshield sections 91 and 92 are positioned on the dash of the vehicle by metal strap clips 100 engaging such sections. A clip extension 102 has a layer of cushioning material, as silicone sponge rubber, 104 extending thereover. Such cushioned extension is wedged in against the lower edge of the windshield. A flush bead rivet (not shown) may secure the parts of the clip 100 together in engagement with the protective panel.

FIGS. 8 and 9 show the vehicle of the invention wherein a typical partition membere 110 is secured to the upper portion of the front seat back and extends to anad is secured to the roof of the vehicle. Then to attach protective panels of the invention thereto, one or two panels 112 are provided, contoured to the shape of the partition, and they are secured to faces of the partition as by bolts 114 or equivalent means whereby one or two protective panels can be secured to this partition for protective action.

FIG. 10 of the drawings show yet another manner in which a single plastic sheet or panel 100, that is contoured to follow the exterior contour of a windshield, can be readily attached thereto. Or, the sheet 100 can be made in two parts hinged together as shown in FIG. 2. Normally this sheet 100 has some type of a suitable resilient positioning strip 102 secured thereto around the margins thereof by the use of any conventional adhesive.

The sheet 100 is engaged with the vehicle by a plurality of flexible webbed straps 106. These straps are suitably threaded through slots 108 formed in vertically spaced portions of the lateral edges of the sheet 100 and with the one end of the strap 106 being riveted or otherwise secured at 101 in engagement with another portion of the strap. The strap continues to the inner surface of the front door post 110 of the vehicle and it can be positioned, for example, under sheet metal or equivalent strips 116 that are engaged, as by cap screws 118 or the like to the metal door post. This provides a removable connection securing the sheet 100 effectively in operative position.

FIG. 11 shows an attaching clip 120 of generally Z-shape. Such clip is secured to a panel 122 for covering the rear window of a car. The panel 122 is formed in one piece and is smaller than the window. The clips 120 are positioned as by cap screws 124 that are used to secure the window trim strip 126 in position. Or modified cap screws like the screws 98 of FIG. 7 can be used. The panel 122 can be screwed or bolted to a plurality of the clips 120 that engage spaced portions of the periphery of the panel. The clips 120 are shaped to suitably engage the trim strip 126.

Any suitable washers, etc. can be used on the cap screws or bolts attaching the panels to a vehicle.

The panels 42 and 44 of FIG. 2 can be made as one unit or panel, if desired.

Portions of FIGS. 1, 4 and 7 have been enlarged for clarity.

Obviously the attaching means shown in FIG. 7 as the screw 98 with the bolt 95 secured thereto can be used for any panel attachment as is desired.

The protective panels of the invention are readily attached to vehicles to provide protection for occupants of the vehicle and a minimum of special members, holes or other attaching means are required on the vehicle to secure the panels in position. Hence, the objects of the invention have been achieved.

While several complete embodiments of the invention have been disclosed herein, it will be appreciated that modification of these particular embodiments of the invention may be resorted to without departing from the scope of the invention.

What is claimed is:

1. A protective panel for a vehicle comprising a tough bullet resisting transparent plastic sheet, means for removably securing said panel to a vehicle, said sheet contoured to the inside contour of the lower portion of a door and having an upper edge curved towards the window at the upper portion of the door, metal plate attaching means secured to and extending up from such curved upper edge for securing the protective panel to the door, said sheet having an opening therein in which an armrest on the door is received, the sheet having an upwardly and inwardly curved panel section extending over the inner surface of the major portion of said armrest at said opening.

* * * * *